United States Patent [19]

Scott

[11] Patent Number: 4,543,730

[45] Date of Patent: Oct. 1, 1985

[54] LIQUID LEVEL INDICATOR FOR A TILTED CONTAINER

[75] Inventor: Julian C. Scott, Jackson, Tenn.

[73] Assignee: Westinghouse Electric Corp., Pittsburgh, Pa.

[21] Appl. No.: 578,339

[22] Filed: Feb. 9, 1984

[51] Int. Cl.$^4$ .................... G01C 9/00; G01C 9/24
[52] U.S. Cl. ........................... 33/366; 33/378; 33/401
[58] Field of Search ............ 33/366, 378, 401

[56] References Cited

U.S. PATENT DOCUMENTS

| | | | |
|---|---|---|---|
| 1,378,042 | 5/1921 | Lewis | 33/401 |
| 3,276,123 | 10/1966 | Huggenberger | 33/366 |
| 3,486,238 | 12/1969 | Hansen | 33/366 |
| 4,121,347 | 10/1978 | Thele | 33/366 |
| 4,136,955 | 1/1979 | Aeschlimann et al. | 33/366 |

Primary Examiner—Robert I. Smith
Attorney, Agent, or Firm—L. P. Johns

[57] ABSTRACT

A liquid level indicator for use in a tubular container having a central obstruction with clearance space between the obstruction and the container, the indicator characterized by an elongated float arm having opposite ends located on opposite sides of the obstruction with a liquid float on each end so as to move up and down with corresponding movement of a liquid level within the tank, the float arm being connected to a gear box for actuating an indicator on the outside of the container.

5 Claims, 4 Drawing Figures

LIQUID LEVEL INDICATOR FOR A TILTED CONTAINER

BACKGROUND OF THE INVENTION

1. Field of the Invention

This invention relates to an instrument for measuring the changes in the level of a liquid within a tilted container.

2. Description of the Prior Art

Liquid level indicators of various types have been used for specific purposes, such as in U.S. Pat. No. 738,407 to F. T. Cable which discloses a clinometer having a float arm assembly that causes a scale to move under the pointer to indicate the degree of inclination in one plane. In addition, U.S. Pat. No. 2,525,387 to M. R. Volk discloses a semispherical dial, wherein an indicator or pointer is supported by a disc-like buoyant carrier which is floating in a liquid. A weight balances the carrier and as the container is tilted in any direction from the vertical axis the dial moves the changing angle but the pointer remains stationary and vertical. However, most prior patents do not permit a liquid-filled container to be mounted or to be tilted through a functional range of angles. For some purposes it is desirable that a liquid level indicator enables tilting or mounting of a liquid container to any direction from the vertical axis.

SUMMARY OF THE INVENTION

Generally, the liquid level indicator of this invention as used in conjunction with a tubular container having a central obstruction with clearance space between the obstruction and the container with a liquid in the space having a liquid level movable between upper and lower levels limits, the indicator comprising gauge means for indicating the liquid level and having a float device, a gear box, and a dial; the float device including a elongated arm having opposite ends located on opposite sides of the obstruction and a liquid float on each end so as to move the arm up and down with corresponding movement of the liquid level, the floats being on diametrically opposite sides of the container axis and on opposite sides of the center line of the obstruction; the float arm being connected to the gear box for actuating the gear box in response to movement of the arms; and the dial being coupled to the gear box to indicate the liquid level in response to actuation of the gear box.

The advantage of the device of this invention is that it involves a pair of liquid floats whereby it is functional as the container is tilted in any direction from the vertical axis.

DESCRIPTION OF THE PREFERRED EMBODIMENT

Figure 1:
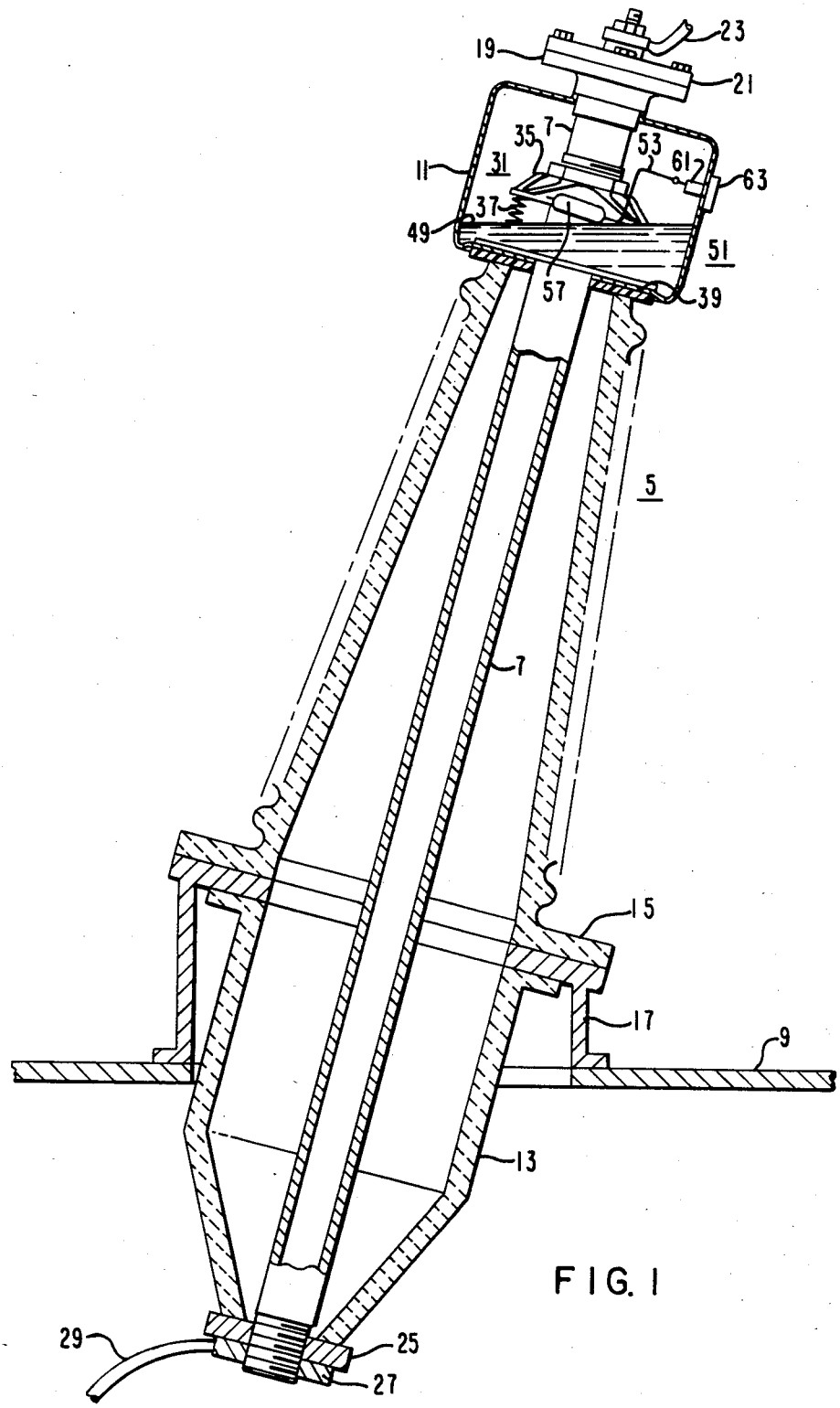
FIG. 1 is a sectional view of a bushing extending at an inclined angle from the top of electrical apparatus in accordance with this invention.

In FIG. 1 a high voltage condenser-bushing assembly includes an insulating bushing or shell 5 encloses a conductor 7 which extends through a transformer tank cover 9. The upper portion of the conductor 7 extends above the upper end of the bushing 5 and through a bushing bowl 11.

The lower end portion of the conductor 7 is contained within a bushing or shell 13 which like the bushing 5 is preferably composed of a dielectric material, such as porcelain or an epoxy resin. The bushings 5, 13 are joined by a flange 15 and a boss 17 on the outer surface of the cover 9. The boss 17 holds the condenser-bushing assembly at an angle inclined to a vertical axis in a conventional manner.

At the top of the bushing 5 a fitting 19 is secured, such as by a weld 18, to the upper end of the conductor 7. A terminal 21 an the fitting is connected to a conductor 23.

At the lower end of the conductor 7 is provided with a support fitting 25, such as a nut, threadedly engaging the lower end of the conductor. A mounting ring 27 secures a conductor 29 to the conductor 7.

Means for holding the assembly of the conductor, bushing, flange, boss, and support fitting together in compression includes a compression mechanism 31 (FIG. 2) within the housing bowl 11. The mechanism includes a spanner nut 33, a spanner 35, a plurality of coil springs 37, and the bottom wall 39 of the bowl 11. Each spring 37 is compressed as required, whereby the conductor 7 is in tension between the spanner nut 33 at the upper end and the support fitting 25 at the lower end. Thus, the bushings or shells 5, 13 are held in compression against the flange 15 and boss 17.

Figure 2:
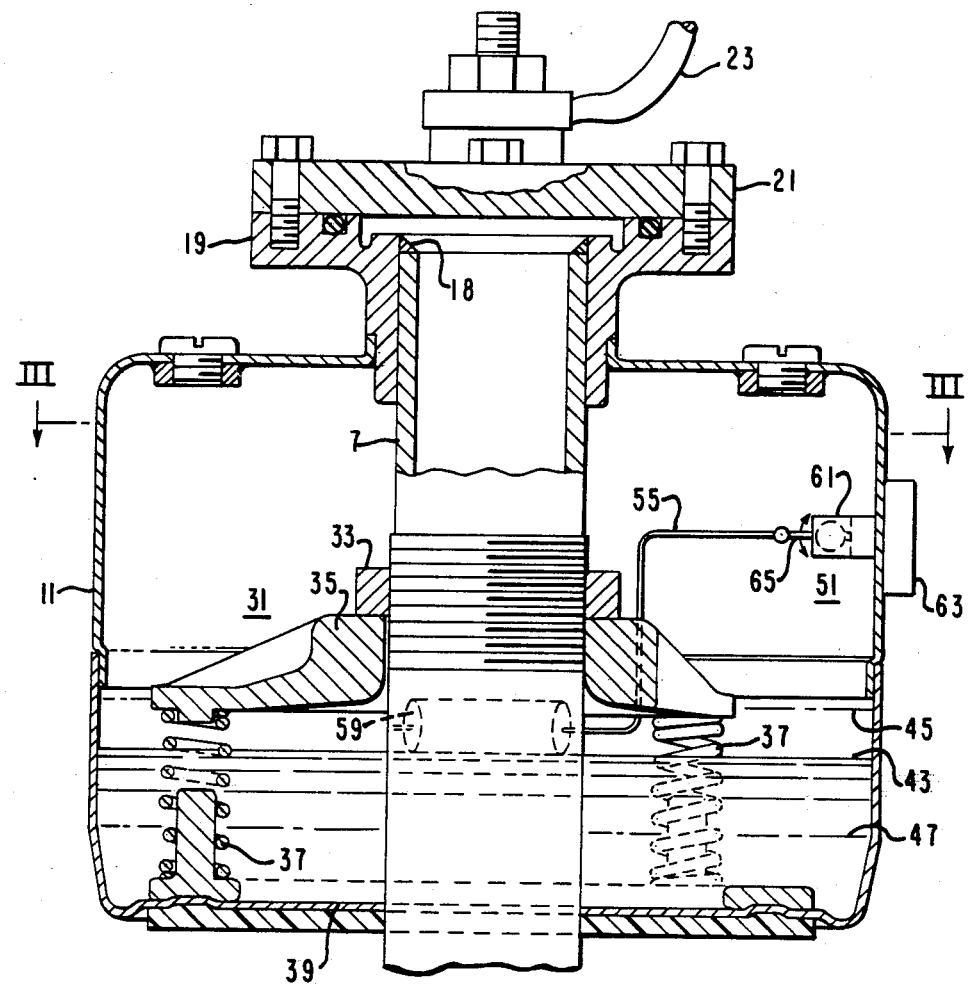
FIG. 2 is a sectional view through the bowl at the upper end of the bushing.

As shown in FIG. 2 the condenser bowl 11 is partially filled with a dielectric fluid having a normal liquid level 43 at ambient temperatures. At higher or lower temperatures the fluid may expand or contract between liquid levels 45 and 47 which facts are pertinent to operation of the bushing and should therefore be known. Where the bushing assembly is tilted or inclined at an angle from the vertical, (FIG. 1) the liquid level 49 is disposed substantially as shown. It is necessary therefore to provide a liquid level indicator to indicate the location of the level outside of the metal condenser bowl 11.

Figure 4:
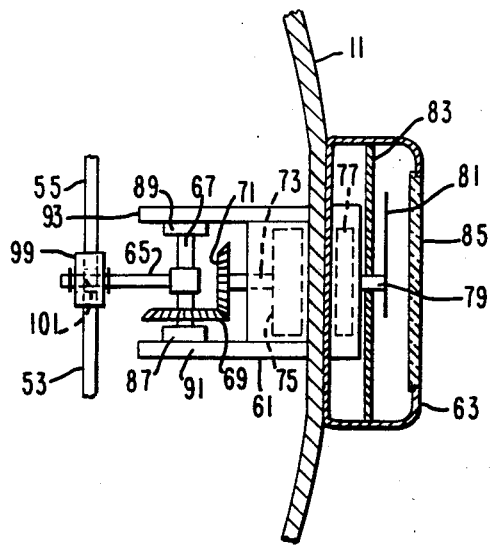
FIG. 4 is an enlarged fragmentary view of the gear box.
Figure 3:
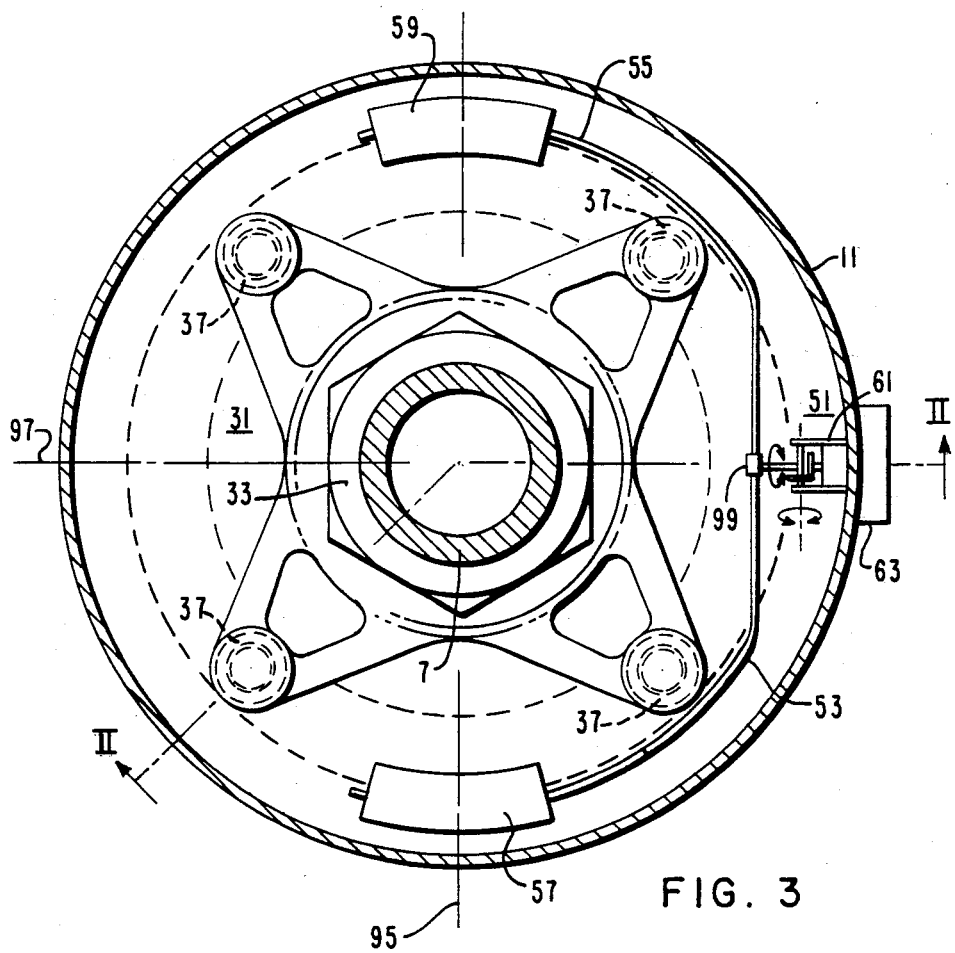
FIG. 3 is a sectional view taken on the line III—III of FIG. 2.

In accordance with this invention a liquid level indicator generally indicated at 51 (FIGS. 2, 3) is provided and includes gauge means including float means, a gear box, and a dial. The float means include elongated members, such as arms 53, 55, a pair of liquid floats 57, 59 on the ends of the arms 53, 55, respectively. The gear box 61 (FIG. 4) is inside the bowl 11 and comprises means for transferring vertical movement of the floats 57, 59 to the dial 63 and includes a lever 65, a shaft 67 interfitting gears 69, 71, a shaft 73, and a magnet 75.

The dial 63 is mounted on the opposite side and external of the bowl 11. The dial 63 includes a magnet 77, a shaft 79, a pointer 81, and a dial face 83 which is visible through a window 85. The shaft 67 is mounted in journals 87, 89 which are mounted on corresponding supports 91, 93 extending from the inner wall of bowl 11. When the floats 57, 59 move up or down in response to changes in the level 49 of the dielectric fluid, the lever 65 rotates the shaft 67 which turns the gears 69, 71 to rotate the magnet 75. The magnet 77 on the opposite side of the bowl 11 rotates correspondingly and moves the pointer 81 to a corresponding position on the dial face 83.

Two floats 57, 59 are required to provide an accurate indication of the level 49 of the liquid because of obstruction, an namely, the conductor 7, and compression mechanism 31. The floats 57, 59 are located in the space around the mechanism 31 and the conductor 7 where the liquid level 49 is available for placement of the floats. For accurate readings of the liquid level 49 the centers of the floats 57, 59 are disposed on a line 95 passing through the vertical axis of the bowl 11 and of the conductor 7.

In addition, the lever 65 of the gear box (FIG. 4) moves in a vertical plane 97 extending through the same vertical axis of the bowl 11 and the conductor 7. The arms 53, 55 are secured in a suitable manner, such as a tube 99 having an aperture 101 through which the lever 65 extends, whereby the assembly of the arms and float are rotatably mounted on the outer end of the lever 65.

Accordingly, the liquid level indicator of this invention provides an accurate indication of the liquid level do to rises and fall thereof in response to temperature variation during operation of the transformer as well as to oil leaks.

What is claimed is:

1. A liquid level indicator comprising:
   a tubular container having a central obstruction with clearance space between the obstruction and the container;
   a liquid in the container around the obstruction and having a liquid level movable between upper and lower levels;
   gauge means for indicating the liquid level and comprising a float device, a gear box, and a dial;
   the float device including an elongated float arm having opposite ends located on opposite sides of the obstruction and a liquid float on each end so as to move the arm up and down with corresponding movement of the liquid level;
   the intermediate portion of the float arm being connected to the gear box for actuating the gear box in response to movement of the arm; and
   the dial being coupled to the gear box to indicate the liquid level in response to actuation of the gear box.

2. The indicator of claim 1 in which the floats are on the opposite sides of the center line of the obstruction.

3. The indicator of claim 2 in which the floats are on the diametrically opposite sides of the container axis.

4. The indicator of claim 3 in which the gear box includes gear means for actuating the dial, and the float arm being coupled to the gear means.

5. The indicator of claim 4 in which the float device and gear box are within the container, the dial is mounted on the outside of the container, and each of the gear box and the dial having magnet cooperative with each other for operating the dial in response to operation of the gear box.

* * * * *